US007200383B2

(12) United States Patent
Eronen

(10) Patent No.: US 7,200,383 B2
(45) Date of Patent: Apr. 3, 2007

(54) SUBSCRIBER AUTHENTICATION FOR UNLICENSED MOBILE ACCESS SIGNALING

(75) Inventor: Pasi Eronen, Helsinki (FI)

(73) Assignee: Nokia Corporation, Espoo (FI)

( * ) Notice: Subject to any disclaimer, the term of this patent is extended or adjusted under 35 U.S.C. 154(b) by 359 days.

(21) Appl. No.: 10/831,352

(22) Filed: Apr. 26, 2004

(65) Prior Publication Data

US 2005/0239441 A1 Oct. 27, 2005

(51) Int. Cl.
H04M 1/66 (2006.01)
(52) U.S. Cl. .................. 455/411; 455/410; 455/422.1; 455/432.1; 455/432.2; 455/432.3; 379/156; 379/161; 379/188; 379/194
(58) Field of Classification Search ................ 455/411, 455/410, 422.1, 432.1, 432.2, 403; 379/161, 379/156, 194, 188; 380/247–250
See application file for complete search history.

(56) References Cited

U.S. PATENT DOCUMENTS

| | | | |
|---|---|---|---|
| 2003/0176186 A1* | 9/2003 | Mohammed ............. | 455/432.1 |
| 2004/0053602 A1 | 3/2004 | Wurzburg | |
| 2004/0116120 A1* | 6/2004 | Gallagher et al. .......... | 455/436 |
| 2004/0203789 A1* | 10/2004 | Hammond et al. ......... | 455/440 |
| 2004/0248595 A1 | 12/2004 | Hicks, III et al. | |
| 2005/0113069 A1* | 5/2005 | Knauerhase et al. ........ | 455/411 |
| 2005/0148353 A1* | 7/2005 | Hicks et al. ................. | 455/466 |
| 2005/0208938 A1* | 9/2005 | Pecen et al. ................. | 455/428 |

FOREIGN PATENT DOCUMENTS

| | | |
|---|---|---|
| EP | 1207708 B1 | 5/2002 |
| EP | 1257141 A1 | 11/2002 |
| EP | 1395068 A1 | 3/2004 |
| WO | WO 02/093811 A2 | 11/2002 |
| WO | WO 2004/ 36770 A2 | 4/2004 |

* cited by examiner

Primary Examiner—Jean Gelin
Assistant Examiner—Khai Nguyen
(74) Attorney, Agent, or Firm—Squire, Sanders & Dempsey LLP

(57) ABSTRACT

A system for ensuring that a first subscriber in a unlicensed mobile access system is prevented from unauthorized use of a second subscriber's identity when the first subscriber requests services from a mobile station to a core network. The system comprises authenticating means for authenticating a mobile station to an unlicensed mobile access network before higher-layer messages are sent from the mobile station, and thereafter, for authenticating the mobile station to a core network. The system also includes a mobile station with a subscriber identity module that includes an identifying means for identifying the mobile station. The system further includes a unlicensed mobile access network for connecting the mobile station to the core network and for relaying signals between the mobile station and the core network. The unlicensed mobile access network comprises checking means for ensuring that higher-layer messages passing through the unlicensed mobile access network to the core network are from the mobile station that authenticated with the unlicensed mobile access network. The system also includes the core network for implementing transaction control and user services. During authentication between the mobile station and the unlicensed mobile access network, the unlicensed mobile access network stores the identifying means that is associated with the mobile station and after authentication between the mobile station and the core network, the unlicensed mobile access network uses the checking means to examine higher-layer messages that are sent from the mobile station to the core network and to ensure that the identifying means associated with mobile station is stored in the higher-layer message.

32 Claims, 5 Drawing Sheets

SUBSCRIBER AUTHENTICATION FOR UNLICENSED MOBILE ACCESS SIGNALING

FIELD OF THE INVENTION

The present invention relates to communications in an unlicensed mobile access network and particularly to authentication of user access during communication between a mobile station and a mobile network.

BACKGROUND OF THE INVENTION

In unlicensed mobile access architecture, a mobile station uses unlicensed radio technology, such as wireless LAN (WLAN) or Bluetooth, to communicate with an unlicensed mobile access network. In such an arrangement, the unlicensed mobile access network replaces the Global System for Mobile Communication Base Station Subsystem (GSM BSS) used in the conventional Global System for Mobile Communication (GSM) arrangement. The interface between the mobile station and the unlicensed mobile access network uses Internet Protocol, at least partly run over unlicensed radio technology, and a new unlicensed radio resource protocol.

In a typical unlicensed mobile access deployment, the mobile station communicates with a WLAN access point that is connected to a broadband Internet connection. Since untrusted networks may be used in the connection between the mobile station and the unlicensed mobile access network, sufficient security features must be provided.

Therefore, in the unlicensed mobile access architecture, the unlicensed mobile access network authenticates the subscriber before any unlicensed radio resources signaling or higher-layer messages, such as Mobility Management, can be sent from the mobile station to the unlicensed mobile access network. The unlicensed mobile access network may authenticate a subscriber on a mobile station by using preexisting authentication methods, such as passwords, certificates or SIM cards. The signaling traffic between the mobile station and the unlicensed mobile access network is encrypted and integrity protected using, for example, IPsec or Transport Layer Security protocols. Optionally, user plane traffic may also be protected using either IPsec or Secure Real-time Transport Protocol.

After the subscriber is authenticated with the unlicensed mobile access network, the subscriber is then authenticated to the Core Network in the unlicensed mobile access architecture. To ensure that the Core Network is authenticating the right subscriber, the Core Network sends a challenge (RAND) to the mobile station. The mobile station uses a subscriber identity module (SIM) card to calculate a response (SRES) and an encryption key (Kc). The mobile station sends the response to the Core Network and if the response is correct, the Core Network activates encryption by sending a "BSSMAP Cipher Mode Command" message to the unlicensed mobile access network. The Cipher Mode Command message includes a list of permitted algorithms and the encryption key. Unlike the GSM arrangement where the BSS selects a suitable algorithm form the Cipher Mode Command message and commands the mobile station to start encryption by sending the selected algorithm to the mobile station, in the unlicensed mobile access architecture, the connection between the mobile station and the unlicensed mobile access network is already encrypted and the algorithms contained in the BSSMAP Cipher Mode Command message are not suitable for IPsec or TLS encryption used between the Mobile Station and the unlicensed mobile access network. Therefore, the unlicensed mobile access network uses neither the algorithm nor the key from the BSSMAP Cipher Mode Command message. Nevertheless, the unlicensed mobile access network forwards the list of algorithms in the Cipher Mode Command to the mobile station and the mobile station stores the parameters and key for later use when performing handover to a GSM network.

The authentication procedure used in the unlicensed mobile access architecture does not ensure that the identity that is authenticated to the unlicensed mobile access network is the same identity that is authenticated to the Core Network. This permits "a man-in-the-middle" attack wherein an attacker who has a valid subscription can, for instance, make calls that get billed to other subscribers.

FIG. 1 illustrates how a subscriber with a valid subscription can perform a man-in-the-middle attack. In Step 1010, the subscriber connects to the unlicensed mobile access network and the unlicensed mobile access network authenticates the subscriber and establishes a secure channel. In Step 1020, unlicensed radio resources signaling is established between the mobile station and the unlicensed mobile access network. In Step 1030, the subscriber requests service with a message that contains the International Mobile Subscribe Identity (IMSI) or the Temporary Mobile Subscriber Identity (TMSI) identifying the subscriber to the Core Network. However, in this step, the subscriber performing the man-in-the-middle attack includes an IMSI or TMSI of another unsuspecting subscriber. In Step 1040, the unlicensed mobile access network forwards the request message to the Core Network without examining the contents of the request message. In Step 1050, in response to the request message, the Core Network sends an authentication request to the mobile station. In Step 1060, when the subscriber receives the request message, instead of calculating the response to the authentication request by using the subscriber's SIM or USIM, the subscriber pretends to be a BSS in a GSM network and forwards the authentication request to the other unsuspecting subscriber. The other unsuspecting subscriber uses its SIM card to calculate a response to the authentication request and sends the response to the subscriber that is pretending to be a BSS. If UMTS protocols are used, an additional "AUTN" parameter is sent by the Core Network and verified by the other unsuspecting subscriber. However, the AUTN parameter does not prevent the man-in-the-middle attack. Upon receiving the response from the other unsuspecting subscriber, the subscriber performing the man-in-the-middle attack forwards the response with the other subscriber's SIM to the unlicensed mobile access network, in Step 1070. In Step 1080, the unlicensed mobile access network forwards the response to the Core Network without examining the contents of the response. In Step 1090, the Core Network verifies the response, which is correct because the other unsuspecting subscriber is a valid subscriber, and sends the BSSMAP Cipher Mode Command message to the unlicensed mobile access network. Since the unlicensed mobile access network does not use the algorithms or key supplied by the Core Network in the Cipher Mode Command message, the unlicensed mobile access network simply forwards the list of permitted algorithms to the subscriber. In Steps 1100, URR Ciphering Mode is completed between the mobile station and the unlicensed mobile access network. In Step 1010, BSSMAP Cipher Mode Command is completed between the unlicensed mobile access network and the Core Network.

After the Cipher Mode setting has been completed with the other subscriber's information, the subscriber is then able to perform normal Mobility Management and Call Control signaling when setting up a call. This causes the Core Network to use the other subscriber's IMSI or TMSI for billing purposes.

SUMMARY OF THE INVENTION

According to one aspect of the invention, there is provided an unlicensed mobile access network for ensuring that a first subscriber in a unlicensed mobile access system is prevented from unauthorized use of a second subscriber's identity when the first subscriber requests services from a mobile station to a core network. The network comprises authenticating means for authenticating a mobile station to the unlicensed mobile access network before higher-layer messages are sent from the mobile station to a core network. The network also comprises connecting means for connecting the mobile station to the core network and for relaying signals between the mobile station and the core network and checking means for ensuring that higher-layer messages passing through the unlicensed mobile access network from the mobile station to the core network are from the mobile station that is authenticated with the unlicensed mobile access network. During authentication between the mobile station and the unlicensed mobile access network, the unlicensed mobile access network stores an identifying means that is associated with the mobile station and after authentication between the mobile station and the core network, the unlicensed mobile access network uses the checking means to examine the higher-layer messages that are sent from the mobile station to the core network and to ensure that the identifying means associated with mobile station is stored in the higher-layer message.

According to another aspect of the invention, there is provided an unlicensed mobile access network for ensuring that a first subscriber in a unlicensed mobile access system is prevented from unauthorized use of a second subscriber's identity when the first subscriber requests services from a mobile station to a core network. The network comprises authenticating means for authenticating a mobile station to the unlicensed mobile access network before higher-layer messages are sent from the mobile station to a core network. The network also comprises connecting means for connecting the mobile station to the core network and for relaying signals between the mobile station and the core network. During authentication between the mobile station and the core network, the unlicensed mobile access network includes authentication information in a command message from the core network to the mobile station and in response to the command message, the mobile station includes a code that is encrypted with the authentication information and a key that is calculated in the mobile station.

According to another aspect of the invention, there is provided an unlicensed mobile access network for ensuring that a first subscriber in a unlicensed mobile access system is prevented from unauthorized use of a second subscriber's identity when the first subscriber requests services from a mobile station to a core network. The network comprises authenticating means for authenticating a mobile station to the unlicensed mobile access network before higher-layer messages are sent from the mobile station to a core network, wherein the mobile station comprises a subscriber identity module that includes an identifying means for identifying the mobile station and a key. The network also comprises connecting means for connecting the mobile station to the core network and relaying means for relaying signals between the mobile station and the core network. During authentication between the mobile station and the core network, the mobile station passes the key to a IPsec or TLS layer to the unlicensed mobile access network, thereby ensuring that all further messages sent from the mobile station are protected with the key or keys derived from key.

In another aspect of the invention, there is provided a mobile station in communications with an unlicensed mobile access network for ensuring that a first subscriber in a unlicensed mobile access system is prevented from unauthorized use of a second subscriber's identity when the first subscriber requests services from a mobile station to a core network. The mobile station comprises authenticating means for authenticating the mobile station to the unlicensed mobile access network before higher-layer messages are sent from the mobile station to a core network. The mobile station also comprises a subscriber identity module that includes an identifying means for identifying the mobile station and a key. The mobile station further comprises connecting means for connecting the mobile station to the core network and relaying signals between the mobile station and the core network. During authentication between the mobile station and the core network, the mobile station passes the key to a IPsec or TLS layer, thereby ensuring that all further messages sent from the mobile station are protected with the key or keys derived from key.

In another aspect of the invention, there is provided a system for ensuring that a first subscriber in a unlicensed mobile access system is prevented from unauthorized use of a second subscriber's identity when the first subscriber requests services from a mobile station to a core network. The system comprises authenticating means for authenticating a mobile station to an unlicensed mobile access network before higher-layer messages are sent from the mobile station, and thereafter, for authenticating the mobile station to a core network. The system also includes a mobile station with a subscriber identity module that includes an identifying means for identifying the mobile station. The system further includes a unlicensed mobile access network for connecting the mobile station to the core network and for relaying signals between the mobile station and the core network. The unlicensed mobile access network comprises checking means for ensuring that higher-layer messages passing through the unlicensed mobile access network to the core network are from the mobile station that authenticated with the unlicensed mobile access network. The system also includes the core network for implementing transaction control and user services. During authentication between the mobile station and the unlicensed mobile access network, the unlicensed mobile access network stores the identifying means that is associated with the mobile station and after authentication between the mobile station and the core network, the unlicensed mobile access network uses the checking means to examine higher-layer messages that are sent from the mobile station to the core network and to ensure that the identifying means associated with mobile station is stored in the higher-layer message.

According to another aspect of the invention, there is provided a system for ensuring that a first subscriber in a unlicensed mobile access system is prevented from unauthorized use of a second subscriber's identity when the first subscriber requests services from a mobile station to a core network. The system includes authenticating means for authenticating a mobile station to an unlicensed mobile access network before higher-layer messages are sent from the mobile station, and thereafter, for authenticating the mobile station to a core network. The system also includes a mobile station with a subscriber identity module that includes an identifying means for identifying the mobile station and a key. The system also includes an unlicensed mobile access network for connecting the mobile station to the core network and for relaying signals between the mobile station and the core network for implementing transaction control and user services. During authentication between the mobile station and the core network, the unlicensed mobile access network includes authentication information in a command message from the core network to the mobile station and in response to the command message, the mobile station includes a code that is encrypted with the authentication information and the key.

According to another aspect of the invention, there is provided a system for ensuring that a first subscriber in a unlicensed mobile access system is prevented from unauthorized use of a second subscriber's identity when the first subscriber requests services from a mobile station to a core network. The system includes authenticating means for authenticating a mobile station to an unlicensed mobile access network before higher-layer messages are sent from the mobile station, and thereafter, for authenticating the mobile station to a core network. The system also includes a mobile station with a subscriber identity module that includes an identifying means for identifying the mobile station and a key. The system further includes a unlicensed mobile access network for connecting the mobile station to the core network and for relaying signals between the mobile station and the core network for implementing transaction control and user services. During authentication between the mobile station and the core network, the mobile station passes the key to a IPsec or TLS layer, thereby ensuring that all further messages sent from the mobile station are protected with the key or keys derived from key.

In another aspect of the invention, there is provided a method in an unlicensed mobile access network for ensuring that a first subscriber in a unlicensed mobile access system is prevented from unauthorized use of a second subscriber's identity when the first subscriber requests services from a mobile station to a core network. The method includes the steps of authenticating, in an unlicensed mobile access network, a mobile station before higher-layer messages are sent from the mobile station to a core network and forwarding, in the unlicensed mobile access network, a service request from the mobile station to the core network, wherein a IMSI for the mobile station is included in the service request. The method also includes the steps of transmitting, in the unlicensed mobile access network, an authentication request from the core network to the mobile station; forwarding, in the unlicensed mobile access network, an authentication response in response to the authentication request; and examining, by the unlicensed mobile access network, higher-layer messages from the mobile station to the core network to ensure that identifying means associated with mobile station is stored in the higher-layer message.

In another aspect of the invention, there is provided a method in an unlicensed mobile access network for ensuring that a first subscriber in a unlicensed mobile access system is prevented from unauthorized use of a second subscriber's identity when the first subscriber requests services from a mobile station to a core network. The method includes the steps of authenticating, in an unlicensed mobile access network, a mobile station before higher-layer messages are sent from the mobile station to a core network and forwarding, in the unlicensed mobile access network, a service request from the mobile station to the core network, wherein a IMSI for the mobile station is included in the service request. The method also includes the steps of transmitting, in the unlicensed mobile access network, an authentication request from the core network to the mobile station and forwarding, in the unlicensed mobile access network, an authentication response in response to the authentication request, wherein the mobile station creates a key in response to the authentication request. The method further includes the steps of forwarding, in the unlicensed mobile access network, a Cipher Mode Command message created by the core network to the mobile station; including, by the unlicensed mobile access network, authentication information in the Cipher Mode Command message from the core network to the mobile station and forwarding the modified Cipher Mode Command message to the mobile station; and receiving, by the unlicensed mobile access network from the mobile station, a code that is encrypted with the authentication information and the key.

According to another aspect of the invention, there is provided a method for ensuring that a first subscriber in a unlicensed mobile access system is prevented from unauthorized use of a second subscriber's identity when the first subscriber requests services from a mobile station to a core network. The method comprising the steps of authenticating a mobile station to an unlicensed mobile access network before higher-layer messages are sent from the mobile station; requesting service, by the mobile station, from the core network and including a IMSI for the mobile station in the request message; and forwarding, by the unlicensed mobile access network, the request message to the core network without examination of the message by the unlicensed mobile access network. The method also includes the steps of sending an authentication request from the core network to the mobile station through the unlicensed mobile access network; creating an authentication response, by the mobile station, in response to the authentication request and forwarding the authentication response to the core network through the unlicensed mobile access network. The method then includes the steps of verifying the authentication response, by the core network, and sending a Cipher Mode Command message to the unlicensed mobile access network. The method further includes the steps of forwarding a list of permitted algorithms in the Cipher Mode Command message, by the unlicensed mobile access network, to the mobile station; and examining higher-layer messages from the mobile station, by the unlicensed mobile access network, to ensure that the identifying means associated with mobile station is stored in the higher-layer message.

According to another aspect of the invention, there is provided a method for ensuring that a first subscriber in a unlicensed mobile access system is prevented from unauthorized use of a second subscriber's identity when the first subscriber requests services from a mobile station to a core network. The method comprising the steps of authenticating a mobile station to an unlicensed mobile access network before higher-layer messages are sent from the mobile station; requesting service, by the mobile station, from the core network and including a IMSI for the mobile station in the request message; and forwarding, by the unlicensed mobile access network, the request message to the core network without examination of the message by the unlicensed mobile access network. The method also includes the steps of sending an authentication request from the core network to the mobile station through the unlicensed mobile access network; creating an authentication response, by the mobile station, in response to the authentication request and forwarding the authentication response to the core network through the unlicensed mobile access network; and verifying the authentication response, by the core network, and sending a Cipher Mode Command message to the unlicensed mobile access network. The method further includes the steps of including authentication information in a Cipher Mode Command message from the core network to the mobile station and forwarding in the Cipher Mode Command message, by the unlicensed mobile access network, to the mobile station; and in response to the command message, including, by the mobile station, a code that is encrypted with the authentication information and the key and forwarding the response to the unlicensed mobile access network.

In another aspect of the invention, there is provided a method for ensuring that a first subscriber in a unlicensed mobile access system is prevented from unauthorized use of a second subscriber's identity when the first subscriber requests services from a mobile station to, a core network. The method comprising the steps of authenticating a mobile station to an unlicensed mobile access network before higher-layer messages are sent from the mobile station; requesting service, by the mobile station, from the core network and including a IMSI for the mobile station in the request message; and forwarding, by the unlicensed mobile access network, the request message to the core network without examination of the message by the unlicensed mobile access network. The method also includes the steps of sending an authentication request from the core network to the mobile station through the unlicensed mobile access network; creating an authentication response, by the mobile station, in response to the authentication request and forwarding the authentication response to the core network through the unlicensed mobile access network; verifying the authentication response, by the core network, and sending a Cipher Mode Command message to the unlicensed mobile access network; forwarding, by the unlicensed mobile access network, the Cipher Mode Command Message to the mobile station; and passing a key to a IPsec or TLS layer, by the mobile station, thereby ensuring that all further messages sent from the mobile station are protected with the key or keys derived from key.

In another aspect of the invention, there is provided a method in an arrangement implementing an unlicensed mobile access network for ensuring that a first subscriber in a unlicensed mobile access system is prevented from unauthorized use of a second subscriber's identity when the first subscriber requests services from a mobile station to a core network. The method including the steps of authenticating a mobile station to an unlicensed mobile access network before higher-layer messages are sent from the mobile station and requesting service, by the mobile station, from the core network and including a IMSI for the mobile station in the request message. The method also includes the steps of creating an authentication response, by the mobile station, in response to the authentication request from the core network and forwarding the authentication response to the core network through the unlicensed mobile access network and passing a key to a IPsec or TLS layer, by the mobile station, thereby ensuring that all further messages sent from the mobile station are protected with the key or keys derived from key.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF EMBODIMENTS

Reference will now be made in detail to the preferred embodiments of the present invention, examples of which are illustrated in the accompanying drawings. The present invention described below extends the functionality of the inventive method for authenticating a mobile station with both an unlicensed mobile access network and a Core Network.

The present invention relates to authentication of a mobile station in a system implementing the unlicensed mobile access architecture so as to prevent "man-in-the-middle" attacks. The unlicensed mobile access arrangement extends the Global System for Mobile Communication/ General Packet Radio Service (GSM/GPRS) mobile services by tunneling certain GSM/GPRS protocols from a Core Network over a broadband Internet Protocol (IP) to a customer's premise, and then relaying them over an unlicensed radio link inside the customer's premises. Unlicensed mobile access is designed as a complement to traditional GSM/GPRS radio coverage and is used to enhance customer premise coverage, increase network capacity and potentially lower cost. The unlicensed mobile access network in the unlicensed mobile access arrangement is designed to coexists with the GSM/GPRS radio access network and to interconnect the GSM Core Network and the mobile station via the same interfaces used by the standard GSM Base Station Subsystem (GSM BSS). Therefore, the unlicensed mobile access network appears to the GSM/GPRS Core Network as a GSM BSS and is managed and operated as such. It should be noted that unlicensed mobile access could be used with UMTS protocols instead of GSM protocols. In this case the unlicensed mobile access network appears to be a Radio Access Network to the Core Network.

Figure 1:
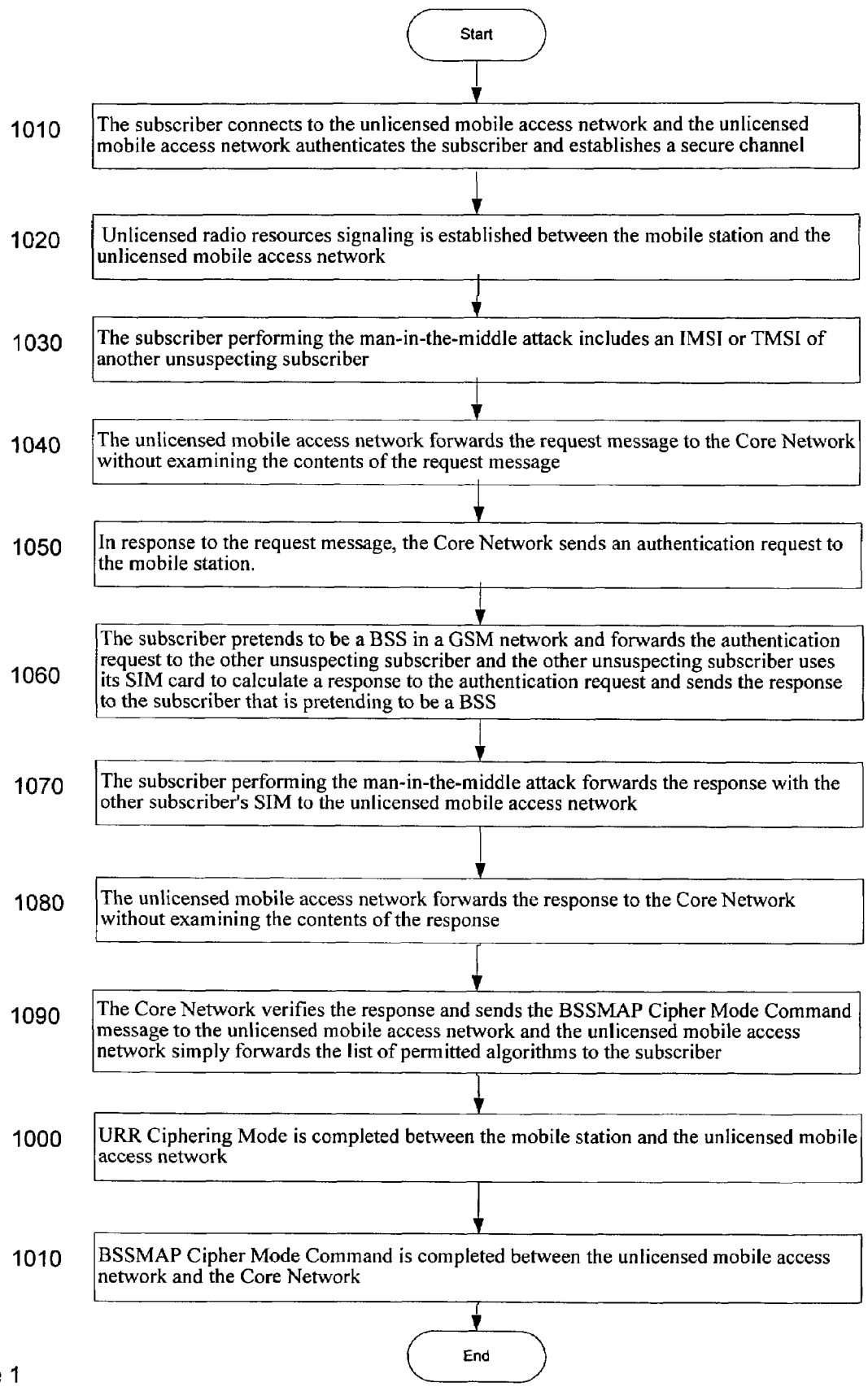
FIG. 1 illustrates how a subscriber with a valid subscription can perform a man-in-the-middle attack.
Figure 2:
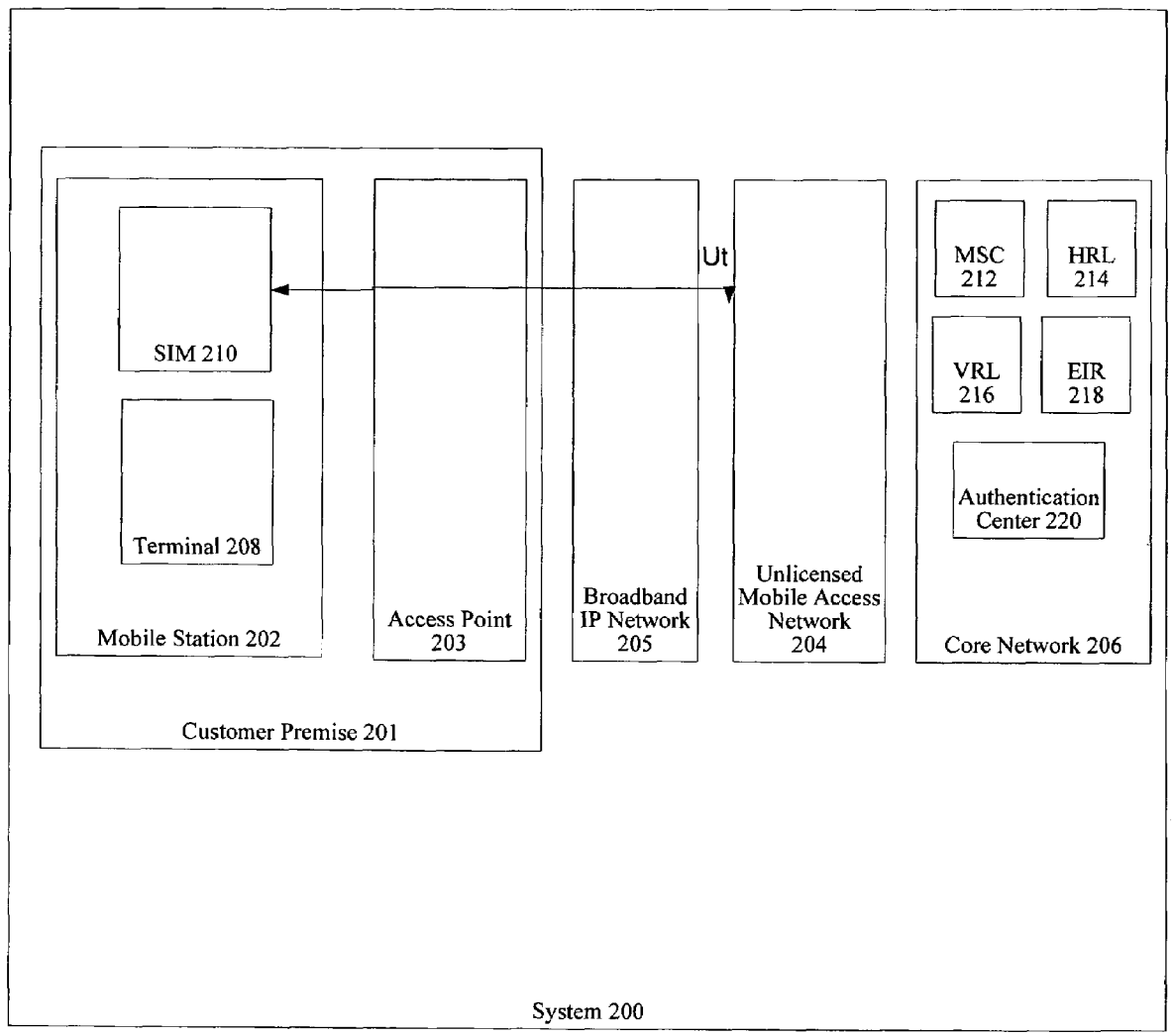
FIG. 2 illustrates the components of a system 200 implementing the unlicensed mobile access architecture in which the present invention is implemented.

FIG. 2 illustrates the components of a system 200 implementing the unlicensed mobile access architecture in which the present invention is implemented. System 200 includes three primary components: a mobile station 202, an unlicensed mobile access network 204, and a Core Network 206. As is apparent to those skilled in the art, mobile station 202 may include a telephone, a laptop, a PDA or any other device that is used by a subscriber in an unlicensed mobile access arrangement. Mobile station 202 is present on a customer premise 201 and mobile station 202 includes a mobile terminal 208 and a Subscriber Identity Module (SIM) 210. Unlicensed mobile access network 204 provides the functional equivalents of a GSM/GPRS base station controller in that unlicensed mobile access network 204 connects mobile station 202 to Core Network 206 and communicates with Mobile Station 202 via the standard GSM A-interface for circuit and switched voice services and the standard GPRS $G_b$-interface for packet data services. Core Network 206 implements the principle elements of transaction control and user services. A broadband IP network 205 provides connectivity between customer premise 201 and unlicensed mobile access network 204 and an access point 203 provides unlicensed radio link to mobile station 202. An IP transport network extends from unlicensed mobile access network 204 to Mobile Station 202 through access point 203 in customer premise 201, thus enabling a single interface, UT, to be defined between unlicensed mobile access network 204 and mobile station 202.

Specifically, in mobile station 202, SIM 210 is a smart card that provides personal mobility so that a user can have access to subscribed services when SIM 210 is inserted into any terminal. Therefore, when SIM 210 is inserted into a terminal, the user is able to receive calls at that terminal, make calls from that terminal and receive other subscribed services. A International Mobile Equipment Identity (IMEI) uniquely identifies mobile station 202 and SIM 210 includes, among other information, the International Mobile Subscriber Identity (IMSI), that is used to identify the subscriber to the system, and a secret key Kc for authentication. The IMEI and IMSI are independent, thereby allowing for personal mobility. As is known to those of ordinary skill in the art, SIM 210 may be protected against unauthorized use by a password or a personal identity number.

In the unlicensed mobile access architecture, mobile station 202 provides dual mode, i.e. licensed and unlicensed, radios and the capability to switch between them. An access mode switch is provided to switch between the GSM mode and the unlicensed mobile access mode. Mobile station 202 supports an IP interface to access point 203, thereby enabling the IP network from unlicensed mobile access network 204 to extend to mobile station 202. Access point 203 preferably does not provide any unlicensed mobile access specific gateway functions. Therefore, any standard access point may be used to interconnect mobile station 202 to unlicensed mobile access network 204 via broadband IP network 205. Access point 203 provides unlicensed radio link toward mobile station 202 and it connects through broadband IP network 205 to unlicensed mobile access network 204.

As noted above, unlicensed mobile access network 204 provides the functions equivalent to that of a GSM/GPRS base station controller. It connects via an IP transport network to customer premise 201 and through access point 203 to mobile station 202. Unlicensed mobile access network 204 maintains end-to-end communications with mobile station 203 and relays GSM/GPRS signal to Core Network 206. In particular, it maps voice from customer premise 201 to PCM voice when a Mobile Switching Center in Core Network 206 is not using certain features.

Core Network 206 includes a Mobile Switching Center (MSC) 212, a Home Location Register (HLR) 214, a Visitor Location Register (VLR) 216, an Equipment Identity Register (EIR) 218 and an Authentication Center 220. MSC 212 acts like a normal switching node of the PSTN or ISDN and provides all of the functionality for handling a mobile subscriber, such as registration, authentication, location updating, handovers and call routing to a roaming subscriber. MSC 212 also provides the connection to fixed networks, such as PSTN or ISDN. HRL 214 works with MSC 212 and VLR 216 to provide the call routing and roaming capabilities of GSM. HRL 214 includes all of the administrative information of each subscriber that is registered in the corresponding GMS network and the current location of mobile station 202. VLR 216 includes selected administrative information, from HLR 214, that are necessary for call control and provision of the subscribed services for each mobile station that is currently located in the geographical area controlled by VLR 216. EIR 218 is a database that includes a list of all valid mobile equipment on the network, wherein each mobile station is identified by its IMEI. Authentication Center 220 is a protected database that stores a copy of the secret key that is stored in each subscriber's SIM 210 card, wherein the secret key is used for authentication and encryption over the radio channel.

The Ut interface between unlicensed mobile access network 204 and mobile station 202 operates over an IP transport network and relays GSM/GPRS signaling from the Public Land Mobile Network (PLMN) Core Network 206 towards mobile station 202. The Ut interface enables GSM Mobility Management protocols and protocols above that level in Core Network 206 to be carried transparently between mobile station 202 and MSC 212. This allows mobile station 202 to derive all GSM services as if it were in a GSM BSS. In the unlicensed mobile access architecture, Unlicensed Mobile Access-Radio Resource (UMA-RR) protocol replaces the conventional GSM-RR protocol since an unlicensed radio link presents different characteristics from that of a licensed radio link. A transport and multiplexing Unlicensed Mobile Access Transport Protocol (UMA-TP) is defined to carry the UMA-RR messages over a secure tunnel between mobile station 202 and unlicensed mobile access network 204. The unlicensed mobile access secure tunnel uses SSL/TCP over IP and is responsible for setting up the secure tunnel. The unlicensed mobile access secure tunnel is also responsible for managing the unlicensed radio link with the standard access point 203. In the unlicensed mobile access architecture, standard IP technology is used in mobile station 202 to access the unlicensed radio link.

Prior to receiving any unlicensed radio resources signaling or higher-layer messages from the mobile station, unlicensed mobile access network 204 authenticates a subscriber on mobile station 202 by using preexisting authentication methods, such as passwords, certificates or SIM cards. The signaling traffic between mobile station 204 and unlicensed mobile access network 206 is encrypted and integrity protected using, for example, IPsec or Transport Layer Security protocols. After the subscriber is authenticated with unlicensed mobile access network 204, the subscriber may then be authenticated to Core Network 206.

Figure 3:
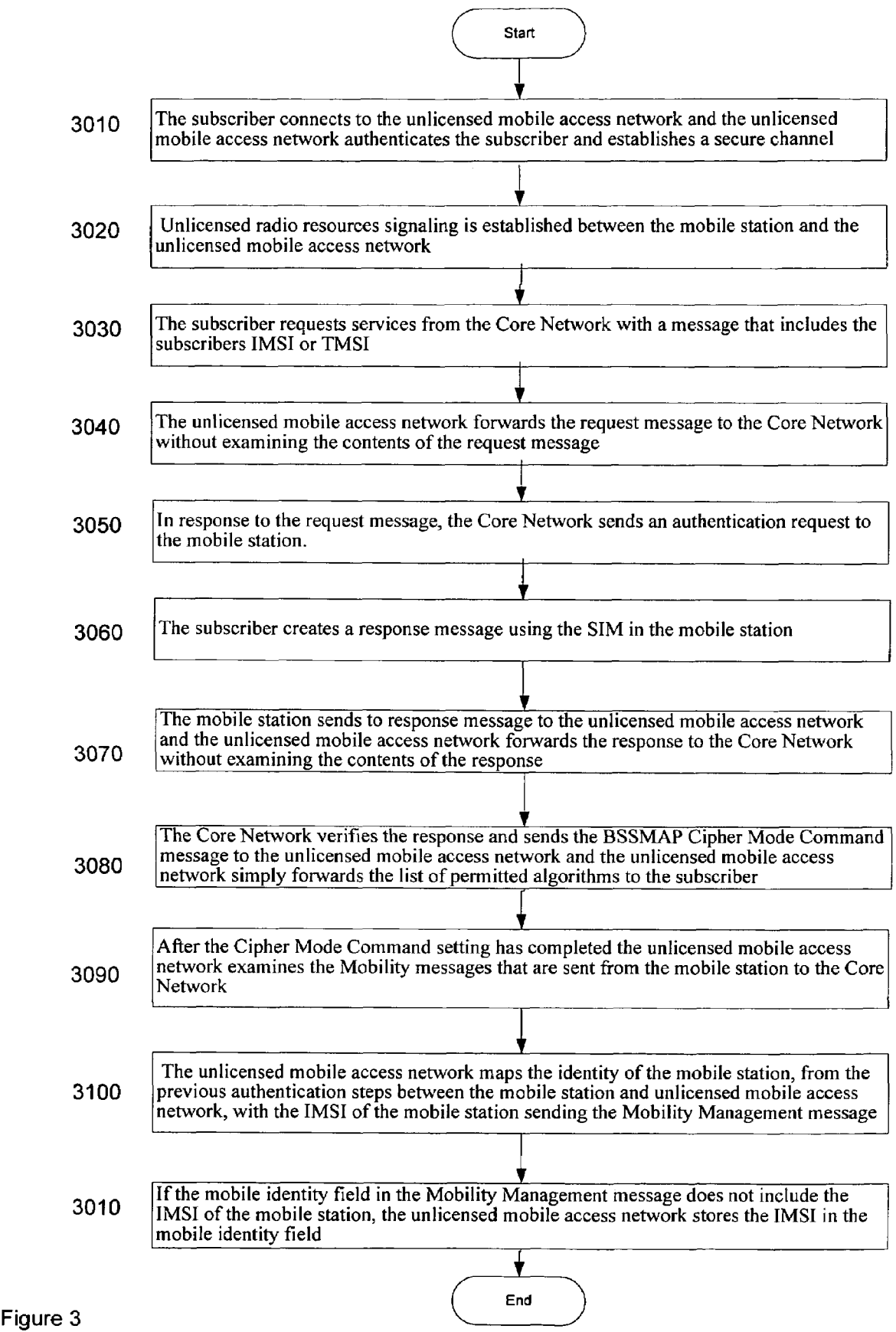
FIG. 3 illustrates the steps implemented in an embodiment of the invention that prevents man-in-the-middle attacks by a valid subscriber.

FIG. 3 illustrates the steps implemented in an embodiment of the invention that prevents man-in-the-middle attacks by a valid subscriber. In Step 3010, the subscriber connects to unlicensed mobile access network 204 and unlicensed mobile access network 204 authenticates the subscriber and establishes a secure channel. In Step 3020, unlicensed radio resources signaling is established between unlicensed mobile access network 204 and mobile station 202. In Step 3030, the subscriber requests service from Core Network 206 with a message that includes the International Mobile Subscribe Identity (IMSI) or the Temporary Mobile Subscriber Identity (TMSI) identifying the subscriber to Core Network 206. In Step 3040, unlicensed mobile access network 204 forwards the request message to Core Network 206 without examining the contents of the request message. In Step 3050, in response to the request message, Core Network 206 sends an authentication request to mobile station 202. In Step 3060, the subscriber creates a response message using SIM 210 in mobile station 202. In Step 3070, mobile station 202 sends the response message to unlicensed mobile access network 204 and unlicensed mobile access network 204 forwards the response message to Core Network 206 without examining the contents of the response message. In Step 3080, Core Network 206 verifies the response and sends the BSSMAP Cipher Mode Command message to unlicensed mobile access network 204. Since unlicensed mobile access network 204 does not use the algorithms or key supplied by Core Network 206 in the Cipher Mode Command message, unlicensed mobile access network 204 simply forwards the list of permitted algorithms to the subscriber. In Step 3090, after the Cipher Mode setting has completed, unlicensed mobile access network 204 examines the Mobility Management messages that are sent from mobile station 202 to Core Network 206. The Mobility Management messages include CM Service Request, CM Re-establishment Request, Identity Response, IMSI Detach Indication, Location Updating Request and Attach Request messages. In Step 3100, unlicensed mobile access network 204 maps the identity of mobile station 202 from the previous authentication steps between mobile station 202 and unlicensed mobile access network 204 with the IMSI of the mobile station sending the Mobility Management message. If the IMSI was not used during the authentication steps between mobile station 202 and unlicensed mobile access network 204, then unlicensed mobile access network 204 may fetch the subscriber profile from the HLR and obtain the IMSI from the HLR. In Step 3010, if the Mobility Management message includes a Mobile Identity field and if the mobile identify field does not include the IMSI of mobile station 202 that was previously authenticated with unlicensed mobile access network 204, unlicensed mobile access network 204 copies the IMSI for mobile station 202 from the authentication process into the mobile identify field. This ensures that one subscriber cannot use a second unsuspecting subscriber's IMSI or TMSI in higher-level messages that are sent from mobile station 202 to core network 204.

Figure 4:
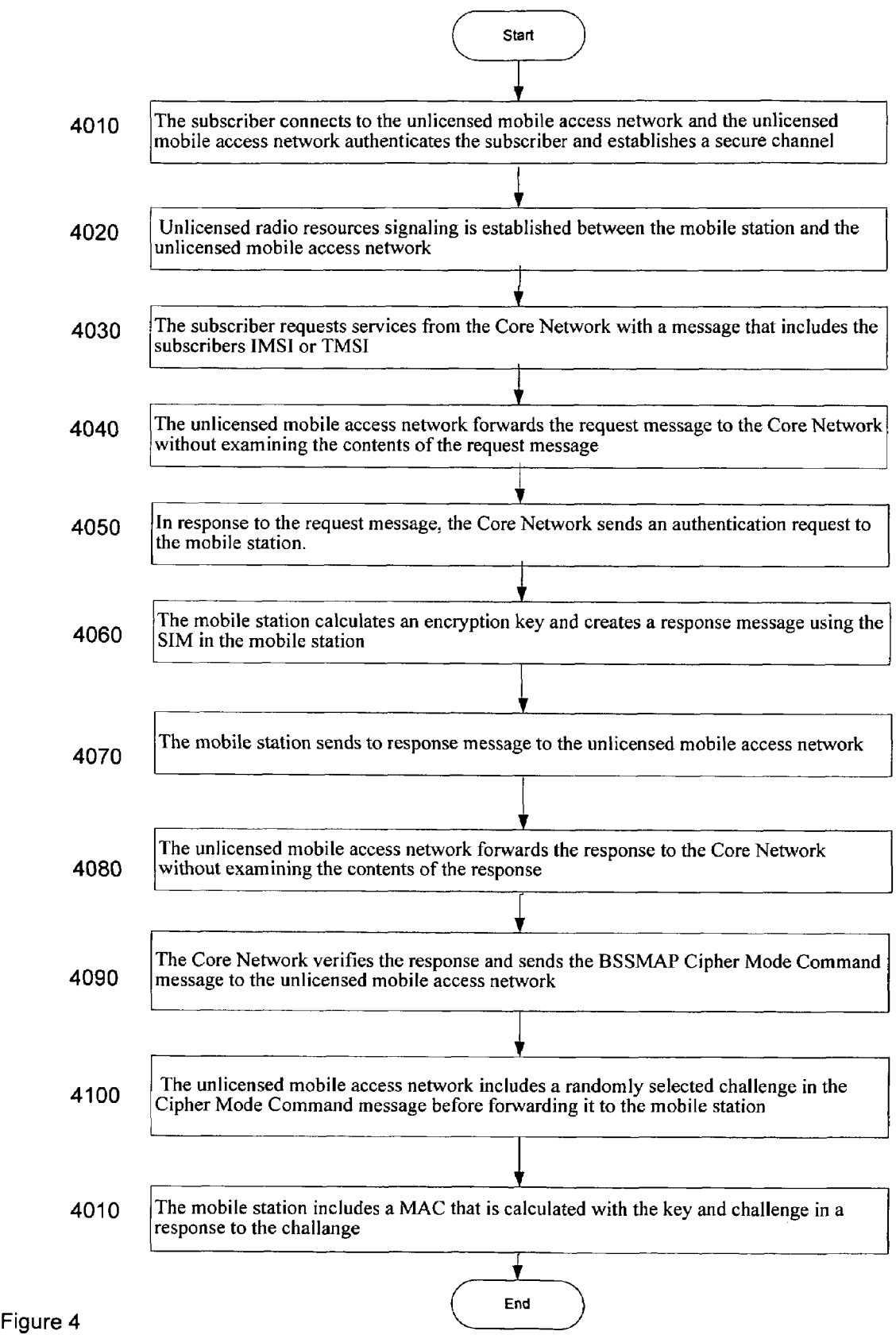
FIG. 4 illustrates the steps implemented in another embodiment for preventing man-in-the-middle attacks in an unlicensed mobile access arrangement.

FIG. 4 illustrates the steps implemented in another embodiment for preventing man-in-the-middle attacks in an unlicensed mobile access arrangement. In Step 4010, the subscriber connects to unlicensed mobile access network 204 and unlicensed mobile access network 204 authenticates the subscriber and establishes a secure channel. In Step 4020, unlicensed mobile access network 204 and mobile station 202 establish unlicensed radio resources signaling. In Step 4030, the subscriber requests service from Core Network 206 with a message that includes the International Mobile Subscribe Identity (IMSI) or the Temporary Mobile Subscriber Identity (TMSI) identifying the subscriber to Core Network 206. In Step 4040, unlicensed mobile access network 202 forwards the request message to Core Network 206 without examining the contents of the request message. In Step 4050, in response to the request message, Core Network 206 sends a challenge to the mobile station. In Step 4060, mobile station 202 calculates an encryption key and creates a response message using SIM 210. In Step 4070, mobile station 202 sends the response message to unlicensed mobile access network 204. In Step 4080, unlicensed mobile access network 204 forwards the response message to Core Network 206 without examining the contents of the response message. In Step 4090, Core Network 206 verifies the response and sends the BSSMAP Cipher Mode Command message to unlicensed mobile access network 204. In Step 4100, unlicensed mobile access network 204 includes a randomly selected challenge, and possibly additional information, in the Cipher Mode Command message before forwarding the Cipher Mode Command message to the subscriber. In Step 4110, in response to the challenge from unlicensed mobile access network 204 in step 4100, mobile station 202 includes a Message Authentication Code (MAC) that is calculated using the encryption key the challenge, and possible the additional information in the message from unlicensed mobile access network 204. Since the encryption key is not sent over a radio link, the present embodiment prevents man-in-the-middle attacks by ensuring that each subscriber has to know the encryption key that is associated with Core Network 206 challenge. In an alternative embodiment, the MAC may include the identity of mobile station, i.e., the IMSI associated with the mobile station, and the identity of unlicensed mobile access network 204 from the authentication, in Step 4010, between mobile station 202 and unlicensed mobile access network 204. In another alternative embodiment, the MAC may include messages related to secure tunnel (IPsec or TLS) established between mobile station 202 and unlicensed mobile access network 204.

Figure 5:
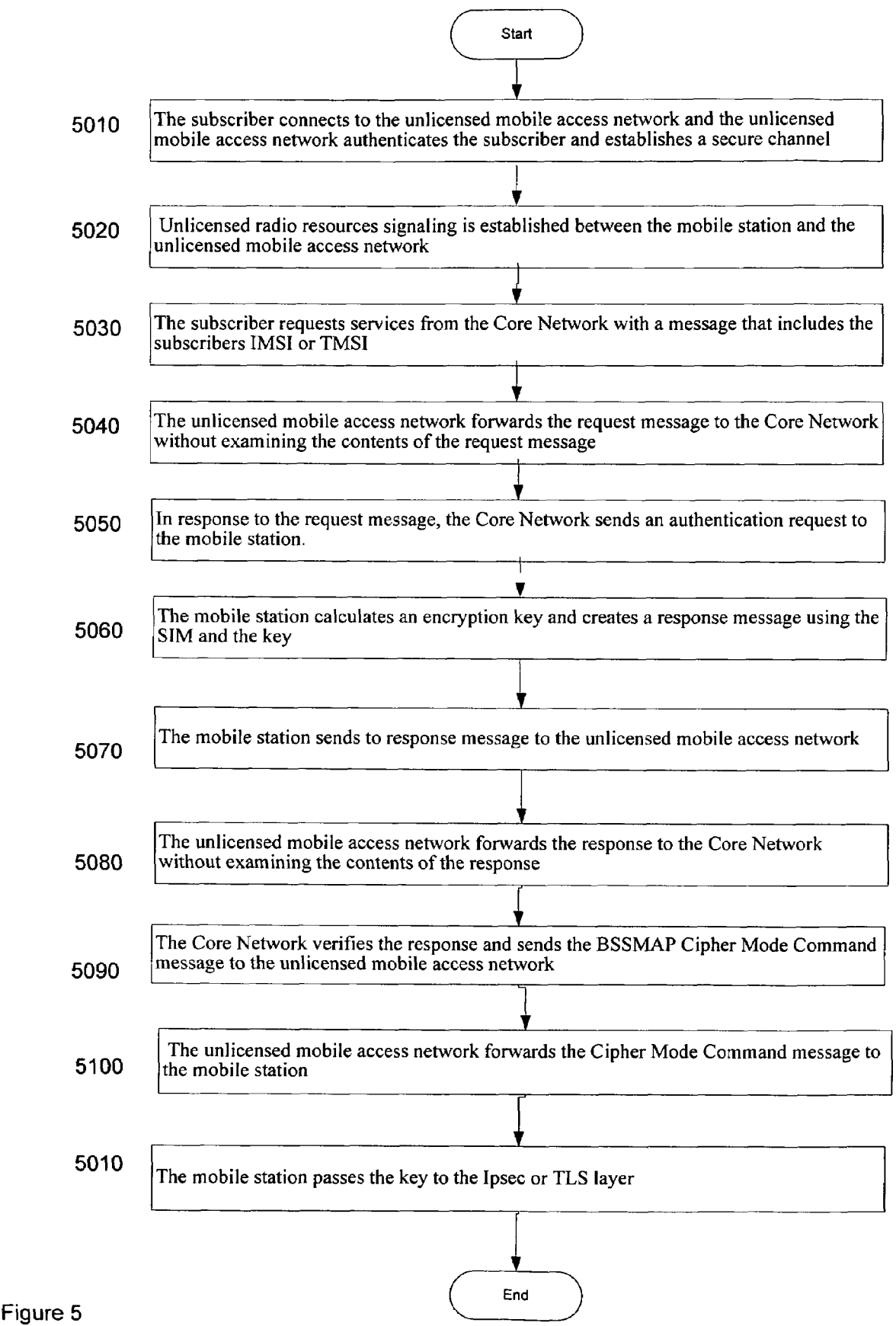
FIG. 5 illustrates the steps implemented in yet another embodiment for preventing man-in-the-middle attacks in an unlicensed mobile access arrangement.

FIG. 5 illustrates the steps implemented in yet another embodiment for preventing man-in-the-middle attacks in an unlicensed mobile access arrangement. In Step 5010, the subscriber connects to unlicensed mobile access network 204 and unlicensed mobile access network 204 authenticates the subscriber and establishes a secure channel. In Step 5020, unlicensed radio resources signaling is established between mobile station 202 and unlicensed mobile access network 204. In Step 5030, the subscriber requests service with a message that includes the International Mobile Subscribe Identity (IMSI) or the Temporary Mobile Subscriber Identity (TMSI) identifying the subscriber to Core Network 206. In Step 5040, unlicensed mobile access network 202 forwards the request message to Core Network 206 without examining the contents of the request message. In Step 5050, in response to the request message, Core Network 206 sends an authentication request to the mobile station. In Step 5060, the subscriber creates a response message using SIM 210 in mobile station 202 and a key Kc. In Step 5070, mobile station 202 sends the response message to unlicensed mobile access network 204. In Step 5080, unlicensed mobile access network 204 forwards the response to Core Network 206 without examining the contents of the response. In Step 5090, Core Network 206 verifies the response and sends the BSSMAP Cipher Mode Command message to unlicensed mobile access network 204. In Step 5100, unlicensed mobile access network 204 forwards the Cipher Mode Command message to the subscriber. In Step 5110, mobile station 202 passes the key Kc to the IPsec or TLS layer. By passing the key to the IPsec or TLS layer, this embodiment ensures that all further messages are protected with the key Kc or keys derived from key Kc and prevents man-in-the-middle attacks because one subscriber cannot obtain another subscribers keys by pretending to be a BSS.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An unlicensed mobile access network, comprising:
   a authentication unit configured to authenticate a mobile station to the unlicensed mobile access network before higher-layer messages are sent from the mobile station to a core network, thereby ensuring that a first subscriber in a unlicensed mobile access system is prevented from unauthorized use of a second subscriber's identity when the first subscriber requests services from the mobile station to the core network;

a connecting unit configured to connect the mobile station to the core network and for relaying signals between the mobile station and the core network; and a checking unit configured to ensure that higher-layer messages passing through the unlicensed mobile access network from the mobile station to the core network are from the mobile station that is authenticated with the unlicensed mobile access network, wherein during authentication between the mobile station and the unlicensed mobile access network, the unlicensed mobile access network stores an identifying means that is associated with the mobile station and after authentication between the mobile station and the core network, the unlicensed mobile access network uses the checking unit to examine the higher-layer messages that are sent from the mobile station to the core network and to ensure that the identifying means associated with mobile station is stored in the higher-layer message.

2. A unlicensed mobile access network, comprising:

a authentication unit configured to authenticate a mobile station to the unlicensed mobile access network before higher-layer messages are sent from the mobile station to a core network, thereby ensuring that a first subscriber in a unlicensed mobile access system is prevented from unauthorized use of a second subscriber's identity when the first subscriber requests services from the mobile station to the core network; and a connecting unit configured to connect the mobile station to the core network and for relaying signals between the mobile station and the core network, wherein during authentication between the mobile station and the core network, the unlicensed mobile access network includes authentication information in a command message from the core network to the mobile station and in response to the command message, the mobile station includes a code that is encrypted with the authentication information and a key that is calculated in the mobile station.

3. An unlicensed mobile access network, comprising:

a authentication unit configured to authenticate a mobile station to the unlicensed mobile access network before higher-layer messages are sent from the mobile station to a core network, wherein the mobile station comprises a subscriber identity module that includes an identifying means for identifying the mobile station and a key, thereby ensuring that a first subscriber in a unlicensed mobile access system is prevented from unauthorized use of a second subscriber's identity when the first subscriber requests services from the mobile station to the core network;

a connecting unit configured to connect the mobile station to the core network; and a relaying unit configured to relay signals between the mobile station and the core network, wherein during authentication between the mobile station and the core network, the mobile station passes the key to a IP security or Transport Layer Security layer to the unlicensed mobile access network, thereby ensuring that all further messages sent from the mobile station are protected with the key or keys derived from key.

4. A mobile station in communications with an unlicensed mobile access network, comprising:

a authentication unit configured to authenticate the mobile station to the unlicensed mobile access network before higher-layer messages are sent from the mobile station to a core network, thereby ensuring that a first subscriber in a unlicensed mobile access system is prevented from unauthorized use of a second subscriber's identity when the first subscriber requests services from the mobile station to the core network, a subscriber identity module that includes an identifying unit configured to identify the mobile station and a key;

a connecting unit configured to connect the mobile station to the core network; and a relaying unit configured to relay signals between the mobile station and the core network, wherein during authentication between the mobile station and the core network, the mobile station passes the key to a IP security or Transport Layer Security layer, thereby ensuring that all further messages sent from the mobile station are protected with the key or keys derived from key.

5. A system, comprising:

a authentication unit configured to authenticate a mobile station to an unlicensed mobile access network before higher-layer messages are sent from the mobile station, and thereafter, for authenticating the mobile station to a core network, thereby ensuring that a first subscriber in a unlicensed mobile access system is prevented from unauthorized use of a second subscriber's identity when the first subscriber requests services from the mobile station to the core network;

a mobile station including a subscriber identity module that includes an identifying unit configured to identify the mobile station;

an unlicensed mobile access network configured to connect the mobile station to the core network and for relaying signals between the mobile station and the core network, the unlicensed mobile access network comprising a checking unit configured to ensure that higher-layer messages passing through the unlicensed mobile access network to the core network are from the mobile station that authenticated with the unlicensed mobile access network; and a core network configured to implement transaction control and user services, wherein during authentication between the mobile station and the unlicensed mobile access network, the unlicensed mobile access network stores the identifying means that is associated with the mobile station and after authentication between the mobile station and the core network, the unlicensed mobile access network uses the checking unit to examine higher-layer messages that are sent from the mobile station to the core network and to ensure that the identifying means associated with mobile station is stored in the higher-layer message.

6. The system of claim 5, wherein the unlicensed mobile access network comprises:

mapping means for mapping a International Mobile Subscriber Identity for identifying the mobile station, the unlicensed mobile access network obtains the International Mobile Subscriber Identity from a authentication process between the mobile station and the unlicensed mobile access network, with the International Mobile Subscriber Identity of the mobile station sending the higher layer message to the core network; and storing means for storing the International Mobile Subscriber Identity from the authentication process in the higher layer message if the International Mobile Subscriber Identity already in the higher layer message is different from the International Mobile Subscriber Identity obtained from the authentication process.

7. The system of claim 6, wherein the unlicensed mobile access network comprises fetching means for fetching the International Mobile Subscriber Identity from a subscriber profiler, if the unlicensed mobile access network did not save the International Mobile Subscriber Identity during the authentication process.

8. The system of claim 5, wherein the mobile station provides dual mode radios and an access mode switch to enable the mobile station to switch between the dual mode radios.

9. The system of claim 5, wherein the mobile station is included in a customer premise, the system further comprises:
   a broadband Internet Protocol network for connecting the customer premise and the unlicensed mobile access network; and
   an access point in the customer premise for providing unlicensed radio link to the mobile station and for connecting to the unlicensed mobile access network through the broadband Internet Protocol network,
   wherein the mobile station supports an Internet Protocol transport interface that enables an Internet Protocol network to extend from the unlicensed mobile access network to the mobile station through the access point, and
   wherein the Internet Protocol transport network enables a single interface, to be defined between the unlicensed mobile access network and the mobile station.

10. The system of claim 9, wherein the single interface comprises a relay component for relaying Global System for Mobile communications/General Packet Radio Service signaling from a Public Land Mobile Network Core Network towards the mobile station, wherein the single interface enables protocols at or above the GSM Mobility Management level to be carried transparently between the mobile station and a mobile switching center in the core network thereby allowing the mobile station to derive all GSM services as if the mobile station were communicating with a Global System for Mobile Communication Base Station Subsystem.

11. The system of claim 9, wherein the access point is a standard access point.

12. The system of claim 9, wherein the unlicensed mobile access network comprises a mapping component for mapping voice from the customer premise to Pulse Coded Modulation voice when a Mobile Switching Center in the Core Network is not implementing certain features.

13. The system of claim 9, further comprising protocol means for enabling a transport and multiplexing protocol to transport messages that are associated with a radio resources protocol over a secure tunnel between the mobile station and the unlicensed mobile access network, wherein the secure tunnel uses Secure Socket Layer/Transmission Control Protocol over Internet Protocol and is responsible for managing the unlicensed radio link with the access point and wherein the mobile station uses standard Internet Protocol technology to access the unlicensed radio link.

14. The system of claim 5, wherein the unlicensed mobile access network includes communication means for enabling the unlicensed mobile access network to communicate with the mobile station via the standard Global System for Mobile communications A-interface and General Packet Radio Service $G_b$-interface.

15. The system of claim 5, further wherein the authentication means is used for enabling the mobile station to authenticate with the unlicensed mobile access network via at least one of a password, a certificate or an subscriber identity module card.

16. The system of claim 5, further comprising encryption means for encrypting signaling traffic between the mobile station and the unlicensed mobile access network.

17. A system, comprising:
   authenticating means for authenticating a mobile station to an unlicensed mobile access network before higher-layer messages are sent from the mobile station, and thereafter, for authenticating the mobile station to a core network, thereby ensuring that a first subscriber in a unlicensed mobile access system is prevented from unauthorized use of a second subscriber's identity when the first subscriber requests services from the mobile station to the core network;
   a mobile station including a subscriber identity module that includes an identifying means for identifying the mobile station and a key;
   an unlicensed mobile access network for connecting the mobile station to the core network and for relaying signals between the mobile station and the core network; and
   a core network for implementing transaction control and user services,
   wherein during authentication between the mobile station and the core network, the unlicensed mobile access network includes authentication information in a command message from the core network to the mobile station and in response to the command message, the mobile station includes a code that is encrypted with the authentication information and the key.

18. The system of claim 17, wherein the authentication information includes at least a randomly selected challenge.

19. The system of claim 17, wherein the code includes a International Mobile Subscriber Identity associated with the mobile station and the identity of the unlicensed mobile access network, wherein the mobile station obtains the identity of the unlicensed mobile access network during authentication between the mobile station and the unlicensed mobile access network.

20. The system of claim 17, wherein the code includes messages related to a secure tunnel that was established between the mobile station and the unlicensed mobile access network during authentication between the mobile station and the unlicensed mobile access network.

21. A system, comprising:
   authenticating means for authenticating a mobile station to an unlicensed mobile access network before higher-layer messages are sent from the mobile station, and thereafter, for authenticating the mobile station to a core network, thereby ensuring that a first subscriber in a unlicensed mobile access system is prevented from unauthorized use of a second subscriber's identity when the first subscriber requests services from the mobile station to the core network;
   a mobile station including a subscriber identity module that includes an identifying means for identifying the mobile station and a key;
   an unlicensed mobile access network for connecting the mobile station to the core network and for relaying signals between the mobile station and the core network; and
   a core network for implementing transaction control and user services,
   wherein during authentication between the mobile station and the core network, the mobile station passes the key to a IP security or Transport Layer Security layer, thereby ensuring that all further messages sent from the mobile station are protected with the key or keys derived from the key.

22. A method in an unlicensed mobile access network, comprising:
   authenticating, in an unlicensed mobile access network, a mobile station before higher-layer messages are sent from the mobile station to a core network, thereby ensuring that a first subscriber in a unlicensed mobile access system is prevented from unauthorized use of a second subscriber's identity when the first subscriber requests services from the mobile station to the core network;
   forwarding, in the unlicensed mobile access network, a service request from the mobile station to the core network, wherein a International Mobile Subscriber Identity for the mobile station is included in the service request;
   transmitting, in the unlicensed mobile access network, an authentication request from the core network to the mobile station;
   forwarding, in the unlicensed mobile access network, an authentication response in response to the authentication request; and
   examining, by the unlicensed mobile access network, higher-layer messages from the mobile station to the core network to ensure that identifying means associated with mobile station is stored in the higher-layer message.

23. A method in an unlicensed mobile access network, comprising:
   authenticating, in an unlicensed mobile access network, a mobile station before higher-layer messages are sent from the mobile station to a core network, thereby ensuring that a first subscriber in a unlicensed mobile access system is prevented from unauthorized use of a second subscriber's identity when the first subscriber requests services from the mobile station to the core network;
   forwarding, in the unlicensed mobile access network, a service request from the mobile station to the core network, wherein a International Mobile Subscriber Identity for the mobile station is included in the service request;
   transmitting, in the unlicensed mobile access network, an authentication request from the core network to the mobile station;
   forwarding, in the unlicensed mobile access network, an authentication response in response to the authentication request, wherein the mobile station creates a key in response to the authentication request;
   forwarding, in the unlicensed mobile access network, a Cipher Mode Command message created by the core network to the mobile station;
   including, by the unlicensed mobile access network, authentication information in the Cipher Mode Command message from the core network to the mobile station and forwarding the modified Cipher Mode Command message to the mobile station; and
   receiving, by the unlicensed mobile access network from the mobile station, a code that is encrypted with the authentication information and the key.

24. A method in an arrangement implementing an unlicensed mobile access network, comprising:
   authenticating a mobile station to the unlicensed mobile access network before higher-layer messages are sent from the mobile station, thereby ensuring that a first subscriber in a unlicensed mobile access system is prevented from unauthorized use of a second subscriber's identity when the first subscriber requests services from the mobile station to the core network;
   requesting service, by the mobile station, from the core network and including a International Mobile Subscriber Identity for the mobile station in the request message;
   forwarding, by the unlicensed mobile access network, the request message to the core network without examination of the message by the unlicensed mobile access network;
   sending an authentication request from the core network to the mobile station through the unlicensed mobile access network;
   creating an authentication response, by the mobile station, in response to the authentication request and forwarding the authentication response to the core network through the unlicensed mobile access network;
   verifying the authentication response, by the core network, and sending a Cipher Mode Command message to the unlicensed mobile access network;
   forwarding a list of permitted algorithms in the Cipher Mode Command message, by the unlicensed mobile access network, to the mobile station; and
   examining higher-layer messages from the mobile station, by the unlicensed mobile access network, to ensure that the identifying means associated with mobile station is stored in the higher-layer message.

25. The method of claim 24, further comprising the steps of:
   mapping a International Mobile Subscriber Identity for identifying the mobile station from a authentication process between the mobile station and the unlicensed mobile access network, by the unlicensed mobile access network, with the International Mobile Subscriber Identity of the mobile station sending the higher layer message to the core network; and
   storing the International Mobile Subscriber Identity from the authentication process in the higher layer message if the International Mobile Subscriber Identity already in the higher layer message is different from the International Mobile Subscriber Identity obtained from the authentication process.

26. The system of claim 25, further comprising the step of fetching the International Mobile Subscriber Identity from a subscriber profiler, if the unlicensed mobile access network did not save the International Mobile Subscriber Identity during the authentication process.

27. A method in an arrangement implementing an unlicensed mobile access network, comprising:
   authenticating a mobile station to an unlicensed mobile access network before higher-layer messages are sent from the mobile station, thereby ensuring that a first subscriber in a unlicensed mobile access system is prevented from unauthorized use of a second subscriber's identity when the first subscriber requests services from the mobile station to the core network;
   requesting service, by the mobile station, from the core network and including a International Mobile Subscriber Identity for the mobile station in the request message;
   forwarding, by the unlicensed mobile access network, the request message to the core network without examination of the message by the unlicensed mobile access network;

sending an authentication request from the core network to the mobile station through the unlicensed mobile access network;

creating an authentication response, by the mobile station, in response to the authentication request and forwarding the authentication response to the core network through the unlicensed mobile access network;

verifying the authentication response, by the core network, and sending a Cipher Mode Command message to the unlicensed mobile access network;

including authentication information in a Cipher Mode Command message from the core network to the mobile station and forwarding in the Cipher Mode Command message, by the unlicensed mobile access network, to the mobile station; and in response to the command message, including, by the mobile station, a code that is encrypted with the authentication information and the key and forwarding the response to the unlicensed mobile access network.

28. The method of claim 27, further comprising storing at least a randomly selected challenge in the authentication information.

29. The method of claim 27, further comprising storing a International Mobile Subscriber Identity associated with the mobile station and the identity of the unlicensed mobile access network in the code, wherein the mobile station obtains the identity of the unlicensed mobile access network during authentication between the mobile station and the unlicensed mobile access network.

30. The method of claim 27, further comprising storing messages related to a secure tunnel that was established between the mobile station and the unlicensed mobile access network during authentication between the mobile station and the unlicensed mobile access network, in the code.

31. A method in an arrangement implementing an unlicensed mobile access network, comprising:

authenticating a mobile station to an unlicensed mobile access network before higher-layer messages are sent from the mobile station, thereby ensuring that a first subscriber in a unlicensed mobile access system is prevented from unauthorized use of a second subscriber's identity when the first subscriber requests services from the mobile station to the core network;

requesting service, by the mobile station, from the core network and including a International Mobile Subscriber Identity for the mobile station in the request message;

forwarding, by the unlicensed mobile access network, the request message to the core network without examination of the message by the unlicensed mobile access network;

sending an authentication request from the core network to the mobile station through the unlicensed mobile access network;

creating an authentication response, by the mobile station, in response to the authentication request and forwarding the authentication response to the core network through the unlicensed mobile access network;

verifying the authentication response, by the core network, and sending a Cipher Mode Command message to the unlicensed mobile access network;

forwarding, by the unlicensed mobile access network, the Cipher Mode Command Message to the mobile station; and passing a key to a IP security or Transport Layer Security layer, by the mobile station, thereby ensuring that all further messages sent from the mobile station are protected with the key or keys derived from key.

32. A method in an arrangement implementing an unlicensed mobile access network, comprising:

authenticating a mobile station to an unlicensed mobile access network before higher-layer messages are sent from the mobile station, thereby ensuring that a first subscriber in a unlicensed mobile access system is prevented from unauthorized use of a second subscriber's identity when the first subscriber requests services from the mobile station to the core network;

requesting service, by the mobile station, from the core network and including a International Mobile Subscriber Identity for the mobile station in the request message;

creating an authentication response, by the mobile station, in response to the authentication request from the core network and forwarding the authentication response to the core network through the unlicensed mobile access network; and passing a key to a IP security or Transport Layer Security layer, by the mobile station, thereby ensuring that all further messages sent from the mobile station are protected with the key or keys derived from key.

* * * * *